US006454239B1

(12) United States Patent
Boecking

(10) Patent No.: US 6,454,239 B1
(45) Date of Patent: Sep. 24, 2002

(54) VALVE FOR CONTROLLING LIQUIDS

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/856,792

(22) PCT Filed: Sep. 16, 2000

(86) PCT No.: PCT/DE00/03226

§ 371 (c)(1), (2), (4) Date: May 24, 2001

(87) PCT Pub. No.: WO01/23745

PCT Pub. Date: Apr. 5, 2001

(30) Foreign Application Priority Data

Sep. 30, 1999 (DE) ........................................ 199468419

(51) Int. Cl.[7] ................................................ F16K 31/02

(52) U.S. Cl. ............... 251/129.06; 310/328; 239/102.2; 123/498

(58) Field of Search ............................. 251/129.06, 57; 310/328; 239/102.2; 123/498

(56) References Cited

U.S. PATENT DOCUMENTS 3,673,442 A * 6/1972 Sonderegger ............... 310/8.4
4,284,263 A * 8/1981 Newcomb ................... 251/129
4,584,980 A * 4/1986 Weiger et al. .............. 123/458
4,750,706 A * 6/1988 Schlagmuller ......... 251/129.06
5,004,945 A * 4/1991 Tomita et al. .............. 310/328
5,199,641 A * 4/1993 Hohm et al. ............. 239/102.2
5,417,142 A * 5/1995 Lohmann ..................... 91/459
5,845,852 A * 12/1998 Waldman et al. ........ 239/533.8
6,062,532 A * 5/2000 Gurich et al. ................. 251/57
6,240,905 B1 * 6/2001 Boecking .................... 123/498
6,253,736 B1 * 7/2001 Crofts et al. ................ 123/498
6,290,204 B1 * 9/2001 Kienzler et al. .............. 251/57
6,333,586 B1 * 12/2001 Polach et al. ............... 310/328

FOREIGN PATENT DOCUMENTS

DE 29 17 933 A 11/1979
DE 195 38 791 A 4/1997
DE 198 07 903 A 9/1999
EP 0 477 400 A 4/1992

* cited by examiner

*Primary Examiner*—Lesley D. Morris
*Assistant Examiner*—F. Nicolas
(74) *Attorney, Agent, or Firm*—Michael J. Striker

(57) ABSTRACT

A valve for controlling fluids, having a valve member (2), which is axially displaceable in a bore (7) of a valve body (6) and on one end has a valve closing member (8) that cooperates with a seat (9, 10), provided on the valve body (6), for opening and closing the valve (1); having a piezoelectric unit (3) for actuating the valve member (2); and having a tolerance compensating element (22) for compensating for elongation tolerances of the piezoelectric unit (3). The deflection of the piezoelectric unit (3) can be transmitted to the valve member (2) via a deflection element (20), and the piezoelectric unit (3) is disposed with its piezoelectric head (17) toward the valve member in the direction of motion of the valve member (2) essentially inside a length of the deflection element (20) and is connected to the deflection element via the tolerance compensating element (22). The latter is disposed parallel to the piezoelectric unit (3) and has virtually the same tolerance-dictated length-changing behavior as the piezoelectric unit (Drawing).

13 Claims, 1 Drawing Sheet

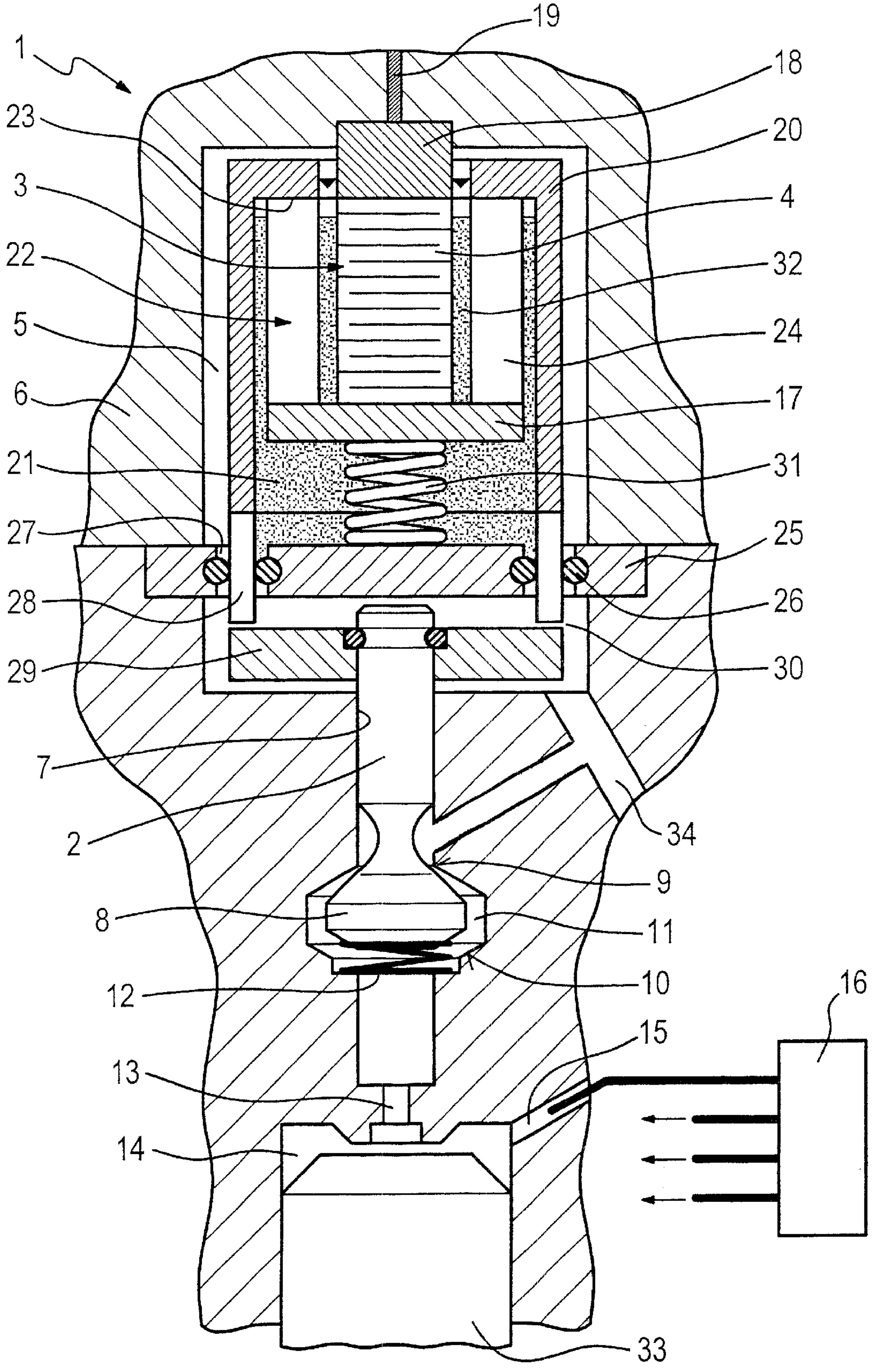
1
19
18
23
20
3
4
22
32
5
24
6
17
21
31
27
25
28
26
29
30
7
2
34
9
8
11
10
12
16
15
13
14
33

VALVE FOR CONTROLLING LIQUIDS

PRIOR ART

The invention relates to a valve for controlling fluids as defined by the preamble to claim 1. From European Patent Disclosure EP 0 477 400 A1, one such valve is already known, which is actuatable via a piezoelectric actuator. This known valve has an arrangement for an adaptive mechanical tolerance compensation, effective in the stroke direction, for a travel transformer of the piezoelectric actuator, in which the deflection of the piezoelectric actuator is transmitted via a hydraulic chamber.

The hydraulic chamber, which functions as a so-called hydraulic step-up means, encloses a common compensation volume between two pistons defining this chamber, of which one piston is embodied with a smaller diameter and is connected to a valve member to be triggered, and the other piston is embodied with a larger diameter and is connected to the piezoelectric actuator.

The hydraulic chamber is fastened between the two pistons in such a way that the actuating piston of the valve member, which piston is retained in its position of repose by means of one or more springs relative to a predetermined position, executes a stroke that is increased by the step-up ratio of the piston diameter when the larger piston is moved a certain travel distance by the piezoelectric actuator. The valve member, piston and piezoelectric actuator are located one after the other on a common axis.

Via the compensation volume of the hydraulic chamber, tolerances caused by temperature gradients in the component or different coefficients of thermal expansion of the materials used and possible settling effects can be compensated for without causing a change in position of the valve member to be triggered.

Compensating for changes in length of the piezoelectric actuator, the valve member or the valve housing by means of the hydraulic chamber disposed between two pistons requires a complicated construction, however, and is problematic in terms of the incident leakage losses and the refilling of the hydraulic chamber.

The object of the invention is to create a valve for controlling fluids having a piezoelectric unit in which in particular a tolerance compensating element is achieved for compensating for elongation tolerances of the piezoelectric unit and/or other valve components, which occupies little space and is simple in design.

ADVANTAGES OF THE INVENTION

The valve for controlling fluids according to the invention as defined by the characteristics of the body of claim 1 has the advantage that it operates at a high natural frequency, since a direct force transmission via the deflection element is provided without a step-up, with which the natural frequency decreases quadratically.

A significant advantage of the invention is also that the valve, with the arrangement according to the invention of the piezoelectric unit, deflection element and tolerance compensating element, has a compact structure.

The tolerance compensating element, in particular for elongation tolerances dictated by temperature changes, is achieved economically according to the invention by simple mechanical means.

Further advantages and advantageous features of the subject of the invention can be learned from the description, drawing and claims.

DRAWING

One exemplary embodiment of the valve for controlling fluids of the invention is shown in the drawing and will be described in further detail below.

The sole drawing FIGURE shows a schematic, fragmentary view of one exemplary embodiment of the invention, in a fuel injection valve for internal combustion engines, in longitudinal section.

DESCRIPTION OF THE EXEMPLARY EMBODIMENT

The exemplary embodiment shown in the drawing illustrates a preferred use of the valve of the invention in a fuel injection valve 1 for internal combustion engines of motor vehicles. In the present case, the fuel injection valve 1 is embodied as a common rail injector for injection of diesel fuel.

To adjust an injection onset, duration of injection, and injection quantity by way of force ratios in the fuel injection valve 1, a valve member 2 is triggered via a piezoelectric unit 3 with a piezoelectric actuator 4, which actuator is disposed on a side of the valve member 2 remote from the combustion chamber in a piezoelectric chamber 5 that in turn is embodied in a valve body or valve housing 6.

The pistonlike valve member 2 is disposed axially displaceably in a bore 7, embodied as a longitudinal bore, of the valve body 6, and on its end toward the combustion chamber it has a valve head 8 forming a valve closing member. The valve member 2 in this case is embodied as a 2/2-way valve, and the valve head 8 cooperates with a first seat 9, embodied on the valve body 6, and a second seat 10. In the raised state of the valve head 8, a communication is established with a spring chamber 11 having a spring device 12 that exerts a restoring force on the outward-opening valve head 8.

It is understood that in an alternate version, it can also be provided that the valve member operates as a 2/3-way valve, with a middle position as well.

The spring chamber 11 is adjoined toward the combustion chamber by an outlet throttle 13, which leads to a valve control chamber 14, into which an injection line 15, represented only symbolically in the drawing, discharges; this line in turn leads away from a high-pressure chamber (common rail) that is common to all the fuel injection valves. The common rail 16 is filled with fuel at high pressure from a tank in a known way by a high-pressure fuel feed pump.

The piezoelectric actuator 4 for actuating the valve member 2 is constructed of a plurality of thin layers, and on its side toward the combustion chamber it has a piezoelectric head 17, and on its side remote from the combustion chamber, it has a piezoelectric foot with an electrical contact 19. The piezoelectric head 17 is connected to a deflection element 20, by means of which a deflection of the piezoelectric actuator 4 can be transmitted to the valve member 2; the piezoelectric unit 3 is disposed, in the direction of motion of the valve member 2, with its piezoelectric head 17 toward the valve member inside a length of the deflection element 20. The deflection element 20 represents an essentially closed deflection sleeve that defines an internal chamber 21.

The piezoelectric actuator 4 is connected to the deflection sleeve 21 via a tolerance compensating element 22 for compensating for elongation tolerances of the piezoelectric unit 3, or to further valve components, such as the valve member 2 or the valve body 6. The tolerance compensating element 22 is disposed parallel to the piezoelectric unit 3; it is connected on one side to the piezoelectric head 17 and on the other to a support 23 on the deflection element 20, in a region adjoining the piezoelectric foot 18.

As the drawing shows, the tolerance compensating element 22 is embodied with two compensation bolts 24, extending parallel to the piezoelectric unit (3), which are secured on the piezoelectric head 17 cantilevered in supportlike fashion across the diameter of the piezoelectric actuator 4.

It is understood that in an alternate version it can also be provided that the tolerance compensating element is embodied with a different number of compensation bolts, or in sleevelike fashion, for example.

In comparison to the piezoelectric unit 3, the tolerance compensating element 22 has an identical tolerance-dictated behavior in terms of a change in length, without causing any motion of the deflection element 20 that affects the position of the valve member 2. To that end, the tolerance compensating element 20 has approximately the same length and coefficient of thermal expansion as the piezoelectric actuator 4.

Since for temperature compensation, a highly conductive heat bridge between the piezoelectric actuator and the tolerance compensating element 22 is necessary, the internal chamber 21 of the deflection element 20 surrounding them is filled with a heat-conducting medium 32, which has a high thermal conductivity. At the same time, the deflection element 20 acts as a container for the heat-conducting medium 32.

In the present version, a heat-conducting paste of silicone oil has been chosen as the heat-conducting medium, but other media can also be used, in particular comprising synthetic oil.

The piezoelectric unit 3 is sealed off from the bore 7, receiving the valve member 2, and from fuel in the bore, and to that end a sealing element 25 is provided, embodied here as a sealing plate, which is supported in the valve body 6 that at that point is embodied in two pieces. The sealing plate 25, for contacting the deflection element 20 to the valve member 2, has through openings 27, each provided with a sealing device 26, which is an O ring or a diaphragm. Through bolts 28 provided on the deflection element 20 extend into the bore 7 through the through openings 27.

The valve member 2, for contacting the through bolts 28 of the deflection element 20, is embodied with a plate 29 whose diameter is substantially equivalent to that of the deflection element 20.

The valve member 2, that is, its plate 29, is separated from the deflection element 20, in the non-activated state of the piezoelectric actuator 4, by an air gap 30. This air gap 30 is dimensioned such that in the event of a possible temperature compensation, motions of the deflection element of a few micrometers can be compensated for.

A spring device 31 is installed in prestressed fashion between the sealing plate 25 and the piezoelectric head 17; it is intended as a prestressing element for the piezoelectric actuator 4, which is constructed of a plurality of layers in what is known as "multilayer" design and prevents its layers from separating when electric current is delivered.

The fuel injection valve 1 of the drawing functions as follows.

In the closed stated of the fuel injection valve 1, that is, when there is not current to the piezoelectric actuator 4, the valve head 8 of the valve member 2 is kept in contact with the first seat 9 assigned to it, so that no fuel from the valve control chamber 14, communicating with the common rail 16, can reach the region of the longitudinal bore 7. The piezoelectric actuator 4 is fastened by the spring device 31 between the piezoelectric head 17 and the piezoelectric foot 18, and the deflection element 20 connected to the piezoelectric head 17 via the tolerance compensating element 22 is kept spaced-apart from the valve member 2 by the air gap 30.

In the event of a slow actuation, as occurs upon a temperature-dictated change in length of the piezoelectric actuator 4, the compensation bolts 24 of the tolerance compensating element 22 elongate in the same way as the piezoelectric actuator 4, so that the deflection element 20 is either unmoved or undergoes only a minimal deflection, which is less than the width of the air gap 30. In each case, this has no effect on the closing and opening position of the valve member 2 and of the fuel injection valve 1 overall.

If an injection is to take place through the fuel injection valve 1, then current is supplied to the piezoelectric actuator 4, causing it to increase its axial length abruptly. Upon this kind of fast actuation of the piezoelectric actuator 4, the deflection element 20 connected to the piezoelectric head 17 is displaced equally markedly in the direction of the valve member 2, causing the deflection element 20 to strike the plate 29 of the valve member 2 and lifting the valve member 2 from its first seat 9 and moving it to an open position against its second seat 10. Thus fuel from the valve control chamber 14 can enter the longitudinal bore 7 of the valve body 6, and the fuel that has entered can escape again through a leak drainage line 34.

In the fuel injection valve 1, embodied as force-compensated, the consequence of the opening of the valve member 2 is that a valve control piston 33 is moved upward in the valve control chamber 14, and fuel is injected through a now-uncovered injection nozzle into the combustion chamber, not otherwise shown.

Upon deactivation of the piezoelectric actuator 4, the length of the piezoelectric actuator shrinks back to its outset length, and by the restoring force of the spring device 12, the valve member 2 is pressed against the first seat 9 on the valve body 6.

What is claimed is:

1. A valve for controlling fluids, having a valve member (2), which is axially displaceable in a bore (7) of a valve body (6) and on one end has a valve closing member (8) that cooperates with a seat (9, 10), provided on the valve body (6), for opening and closing the valve (1); having a piezoelectric unit (3) for actuating the valve member (2); and having a tolerance compensating element (22) for compensating for elongation tolerances of the piezoelectric unit (3) and/or of the valve member (2) and valve body (6), characterized in that a deflection of the piezoelectric unit (3) can be transmitted to the valve member (2) via a deflection element (20), and the piezoelectric unit (3) is disposed with its piezoelectric head (17) toward the valve member in the direction of motion of the valve member (2) essentially inside a length of the deflection element (20) and is connected to the deflection element via the tolerance compensating element (22), which is disposed parallel to the piezoelectric unit (3) and has substantially the same tolerance-dictated length-changing behavior as the piezoelectric unit, without a motion of the deflection element (20) affecting a position of the valve member (2).

2. The valve of claim 1, characterized in that the tolerance compensating element (20) has at least approximately the same length and coefficient of thermal expansion as the piezoelectric unit (3), which includes at least one piezoelectric actuator (4).

3. The valve of claim 1, characterized in that the tolerance compensating element (22) is connected on one side to the piezoelectric head (17) and on the other to a support (23) on the deflection element (20) in a region adjoining a piezoelectric foot (18).

4. The valve of claim 1, characterized in that the region (21) surrounding the piezoelectric unit (3) and the tolerance compensating element (22) is filled with a heat-conducting medium (32) that has a high thermal conductivity.

5. The valve of claim 4, characterized in that the heat-conducting medium (32) is a heat-conducting paste, in particular of synthetic oil.

6. The valve of claim 1, characterized in that the tolerance compensating element (22) is embodied with compensation bolts (24), which extend parallel to the piezoelectric unit (3) and which are secured on one end to the piezoelectric head (17) that is cantilevered to support said piezoelectric unit (3) across a diameter of the piezoelectric unit (3).

7. The valve of claim 1, characterized in that the deflection element (20) is embodied as a deflection sleeve that is at least partly closed and defines an internal chamber (21).

8. The valve of claim 1, characterized in that the piezoelectric unit (3) is sealed off from the bore (7) that receives the valve member (2).

9. The valve of claim 8, characterized in that the piezoelectric unit (3) is sealed off from the bore (7) that receives the valve member (2) by means of a sealing element (25), wherein said sealing element (25) has at least one sealed through opening (27) for contacting the deflection element (20) to the valve member (2).

10. The valve of claim 9, characterized in that the deflection element (20) extends through the sealing element (25), embodied as a sealing plate, into the bore (7) receiving the valve member (2), and wherein through-bolts (28) are provided in the region of the at least one through opening (27) through the sealing plate (25).

11. The valve of claims 9, characterized in that a spring device (31) braced on the sealing element (25) is provided as a prestressing element for the piezoelectric unit (3).

12. The valve of claim 1, characterized in that the valve member (2), for contacting the deflection element (20), is embodied with a plate (29) whose diameter is substantially equivalent to that of the deflection element (20).

13. The valve of claim 1, characterized by its use as a component of a fuel injection valve for internal combustion engines, in particular a common rail injector (1).

* * * * *